June 2, 1959     E. R. JORGENSEN     2,889,180
ROLLER BEARING CONSTRUCTION
Filed Nov. 22, 1954
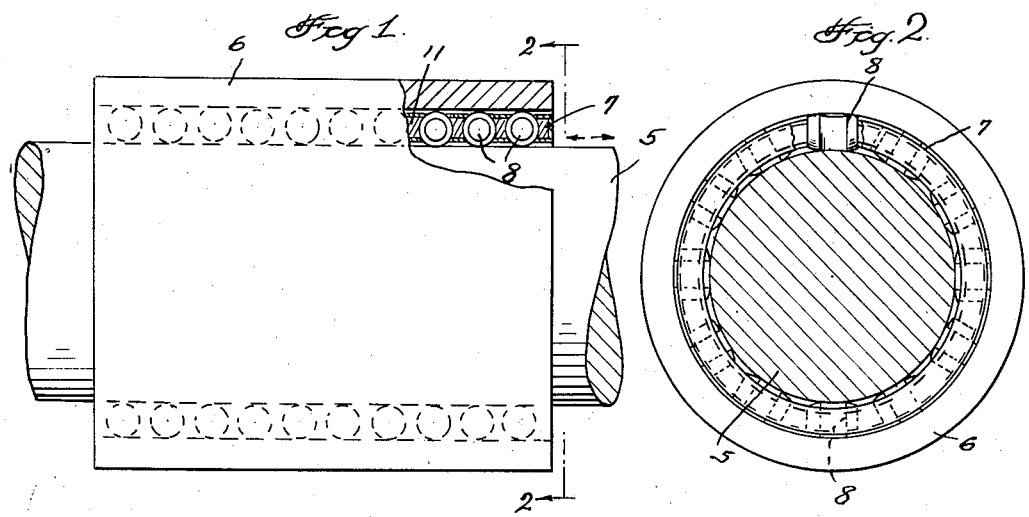
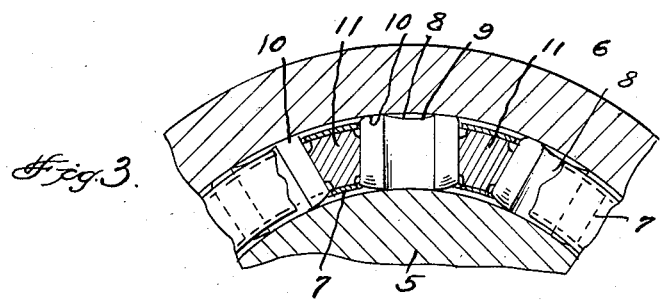
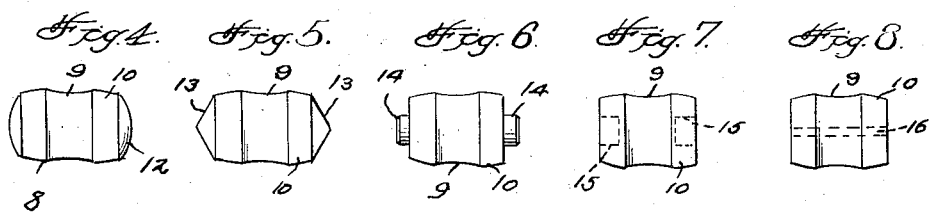
EARL R. JORGENSEN    INVENTOR
BY *CA Snow & Co.*
ATTORNEYS.

United States Patent Office 2,889,180
Patented June 2, 1959

2,889,180
ROLLER BEARING CONSTRUCTION
Earl R. Jorgensen, Los Angeles, Calif.
Application November 22, 1954, Serial No. 470,278
1 Claim. (Cl. 308—6)

This invention relates to roller bearings, the primary object of the invention being to provide a roller bearing designed primarily for use between a cylindrical member and a surrounding concentric cylinder member, to provide an anti-friction translational motion.

An important object of the invention is to provide a bearing wherein the wear surface thereof will be increased appreciably over conventional ball bearings.

Another object of the invention is the provision of a bearing for use between concentric cylinders, the bearings having separate wear surfaces for contact with the curved surfaces of the concentric cylinders, thereby reducing wear of the roller bearings to a minimum.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawing:

Figure 1 is an elevational view of concentric cylinders between which roller bearings constructed in accordance with the invention are mounted.

Fig. 2 is a sectional view taken on line 2—2 of Fig. 1.

Fig. 3 is a fragmental sectional view illustrating concentric cylindrical members for bearings mounted therebetween, a portion of the bearing cage being broken away illustrating a bearing in elevation and spacers in section.

Fig. 4 is an elevational view of one form of roller bearing.

Fig. 5 is an elevational view of a modified form of bearing.

Fig. 6 is an elevational view of a further modified form of bearing member.

Fig. 7 is an elevational view of a still further modified form of bearing.

Fig. 8 is an elevational view of another modified form of roller bearing.

Referring to the drawing in detail, the reference character 5 indicates a solid cylindrical member and the reference character 6 indicates a surrounding concentric cylinder spaced from the cylindrical member 5, as better shown by Fig. 1 of the drawing. The reference character 7 indicates a roller cage in which the rollers 8 are held, the rollers 8 being properly spaced so that they will move freely within the cage.

As shown, each roller comprises a body, the upper surface of which is concavely curved as at 9, throughout the major portion of the length of the bearing, portions of the bearings beyond the ends of the concavely curved portion, being curved at 10, providing bearing surfaces curved to conform to the curvature of the inner surface of the cylinder 6 within which the bearing is mounted.

Thus it will be seen that the concavely curved portion of the bearing will rest directly on the solid cylindrical are provided on each bearing, for contact with the concentric cylinder 6 and the solid cylindrical member 5, as better shown by Fig. 3 of the drawing.

In operation, the bearings are supported in the roller cage 7 and are held in spaced relation with respect to each other by the spacers 11 of generally truncated cylindrical configuration disposed therebetween.

The form of the roller as shown in Figs. 1, 2 and 3 of the drawing, is illustrated in detail by Fig. 8 of the drawing.

As shown by Fig. 4 of the drawing, the roller bearing is of a construction similar to the construction shown in Fig. 8 of the drawing, with the exception that the ends of the bearing indicated at 12 are bulged or convex to fit within recesses of a type of roller bearing cage having sockets to receive the bulged or convex ends 12.

The bearing shown by Fig. 5 is provided with pointed ends 13 that fit into correspondingly shaped recesses formed in another type of bearing cage.

In Fig. 6 the bearing is provided with pintles 14 that fit in openings of a particular type of bearing cage.

In Fig. 7 the bearing is formed with openings 15 formed in the ends thereof to receive pintles that extend from a certain type of bearing cage.

In Fig. 8 the bearing is formed with a shaft opening 16 illustrated in dotted lines, as extending throughout the length of the bearing.

While the modified forms of the roller bearings are shown with various types of means for supporting them in a roller bearing cage, it is pointed out that the important features of the invention are carried out in the various modified forms and embody the concavely curved portions 9 and the curved bearing portions 10 which are curved to contact the inner surface of the concentric cylinder in which the bearings are mounted, the bearings also resting on the solid cylindrical member 5 which reciprocates within the concentric cylinder 6, to the end that separate bearing surfaces are provided for the solid cylindrical member and the concentric cylinder surrounding the same. With this form of bearing it will be obvious that due to the increased wear on bearing surfaces for the members 5 and 6, the bearings will resist wear for a greater length of time than the conventional bearing, and will at the same time reduce friction between the movable members in which the bearings are mounted.

Having thus described the invention, what is claimed is:

A roller bearing for interposing between an outer cylindrical member and an inner cylindrical member, said bearing comprising a plurality of rollers, and a cage securing said rollers in operative position, each roller being disposed with the axis thereof perpendicular to the axis of said inner cylindrical member and having a longitudinal shaft opening, each roller having an annular groove between the ends thereof with the groove being transversely concave and the radius of the arc being equal to the radius of said inner cylindrical member, each roller having transversely convex ends, the radius of the arc of each end being equal to the radius of the inner surface of said outer member, said cage including truncated cylindrical spacers filling the spaces between the adjacent ends of each pair of rollers and said spacers engaging the adjacent ends of the rollers of each pair of rollers.

References Cited in the file of this patent
UNITED STATES PATENTS

| | | |
|---|---|---|
| 1,341,873 | Arnot | June 1, 1920 |
| 1,491,978 | Witmer | Apr. 29, 1924 |
| 2,337,854 | Price | Dec. 28, 1943 |

FOREIGN PATENTS

| | | |
|---|---|---|
| 1,031,490 | France | June 24, 1953 |